United States Patent

Schweppe

[11] 4,317,049
[45] Feb. 23, 1982

[54] FREQUENCY ADAPTIVE, POWER-ENERGY RE-SCHEDULER

[75] Inventor: Fred C. Schweppe, Carlisle, Mass.

[73] Assignee: Massachusetts Institute of Technology, Cambridge, Mass.

[21] Appl. No.: 76,019

[22] Filed: Sep. 17, 1979

[51] Int. Cl.³ .................................................. H02J 3/14
[52] U.S. Cl. ........................................ 307/39; 307/97; 307/129
[58] Field of Search ............... 307/149, 116, 118, 129, 307/125, 39, 40, 31, 35, 96, 97, 34; 364/492, 493

[56] References Cited

U.S. PATENT DOCUMENTS

| | | | |
|---|---|---|---|
| 3,486,033 | 12/1969 | Salo | 307/39 |
| 4,100,428 | 7/1978 | Delisle | 307/97 |
| 4,147,296 | 4/1979 | Spethmann | 307/35 |

FOREIGN PATENT DOCUMENTS 505086 2/1976 U.S.S.R. ................... 309/39

Primary Examiner—Lawrence R. Franklin
Assistant Examiner—S. D. Schreyer
Attorney, Agent, or Firm—Arthur A. Smith, Jr.; Gary A. Walpert

[57] ABSTRACT

A frequency adaptive, power-energy re-scheduler (FAPER) that includes a frequency transducer that notes frequency or frequency deviations of an electrical system and logic means which controls and re-schedules power flow to a load unit in part on the basis of the deviations in frequency from a nominal frequency and in part on the needs to the load unit as expressed by an external sensor signal obtained from the physical system affected by the load unit.

6 Claims, 6 Drawing Figures

FREQUENCY ADAPTIVE, POWER-ENERGY RE-SCHEDULER

The present invention relates to a power-energy rescheduler for certain types of loads on an electrical power system.

By way of background, attention is called to three writings: "Power Systems '2000': hierachical control strategies" (Schweppe) IEEE Spectrum July 1978; "Homeostatic Utility Control" (Schweppe et al.), presented at the Distribution Automation and Control Working Group Meeting, Baltimore Md. November 20–22, 1978; and "Homeostatic Utility Control" (Schweppe et al.), presented at IEEE PES 1979 Summer Power Meeting, Vancouver, B.C., Canada. The author "Schweppe" is the present inventor in each of the writings. The last two of the writings are based on ideas first proposed by the present inventor, which ideas form the foundation for this invention.

Energy costs, including costs of electric power, have risen sharply in the recent past and may be expected to continue to rise in the future. Those costs reflect increases in fuel and operating prices, as well as increased costs in the generation and transmission facilities. This invention is directed to mitigating both types of costs. Variations in load levels on electric utility systems impose real costs. For equity and economic efficiency, the price at the user end should reflect the variation in costs brought about by fluctuation in costs brought about by system load occasioned by load of each customer (see a paper entitled "Impact of New Electronic Technologies To The Customer End of Distribution Automation and Control", Kirtley et al., for further discussion). The concept presented here is that of re-scheduling input to a customer load to supply electric power to that load in part on the basis of capability of the electric system to accept the load rather than simply on the basis of the power requirements of the load; said another way, the present invention provides a mechanism which permits, at the load end, consideration of both the requirements of the load unit and the loading of the electric system when supplying electric energy to that load unit.

Accordingly, it is an object of the present invention to provide a power-energy re-scheduler for controlling transfer of electric energy to user load units based on both the customer's needs and the needs of the overall electric power system as determined by the relationship of the frequency measured at or near the load unit to a nominal, possibly time varying, frequency. This re-scheduling is done so as to try to reduce utility fuel, operating, and capital costs when the utility is in normal operation and to improve the electric power system's dynamic behavior during emergency or other transient conditions.

This and still further objects are addressed hereafter.

The foregoing objects are achieved, generally, in a frequency adaptive, power-energy re-scheduler (FAPER) having, in combination, frequency transducer means that senses electrical input frequency of an electrical system and provides a transducer output based on said sensing and logic means connected to receive as one input the transducer output, as a second input the nominal system frequency, and as a third input a signal obtained by sensing some physical variable that is indicative of the energy requirements of a customer's load unit and being adapted to process these inputs to provide a re-scheduler output which determines the electric power usage of the load unit.

A customer's load unit is considered to contain among other things, a usage device. Two classes of usage devices can be defined as follows. Energy type usage devices are characterized by a need for a certain amount of energy over a period of time in order to fulfill their function and an indifference as to the exact time at which the energy is furnished. Examples include space conditioning, water heating, refrigeration, air compression, pumping, ovens, melting, and grinding. Power type usage devices are characterized by needing power at a specific time. Examples include lighting, computers, TV and many motors used in industrial processes. The FAPER is an invention that is applicable to energy type usage devices. The actual FAPER demonstration involved water pumping into a storage tank but, the invention is applicable to all customer load units containing energy type usage devices.

The invention is hereinafter described with reference to the accompanying drawings in which.

Before proceeding with an explanation with reference to the figures, some preliminary remarks are in order. The concepts disclosed herein constitute a new approach to electric power management. Heretofore and in existing electric power systems, the systems are planned, operated and controlled under the philosophy that the supply (i.e., generation) must follow demand (i.e., the load). The present inventor proposes here a new and different basic philosophy: supply and demand respond to each other and try to maintain a state of equilibrium. Said another way, in the present system both the requirements of the load and the condition of loading of the electric supply as indicated by electrical frequency are monitored simultaneously and a decision is made as to whether energy should or should not be delivered to the load at the time of monitoring.

Figure 1:
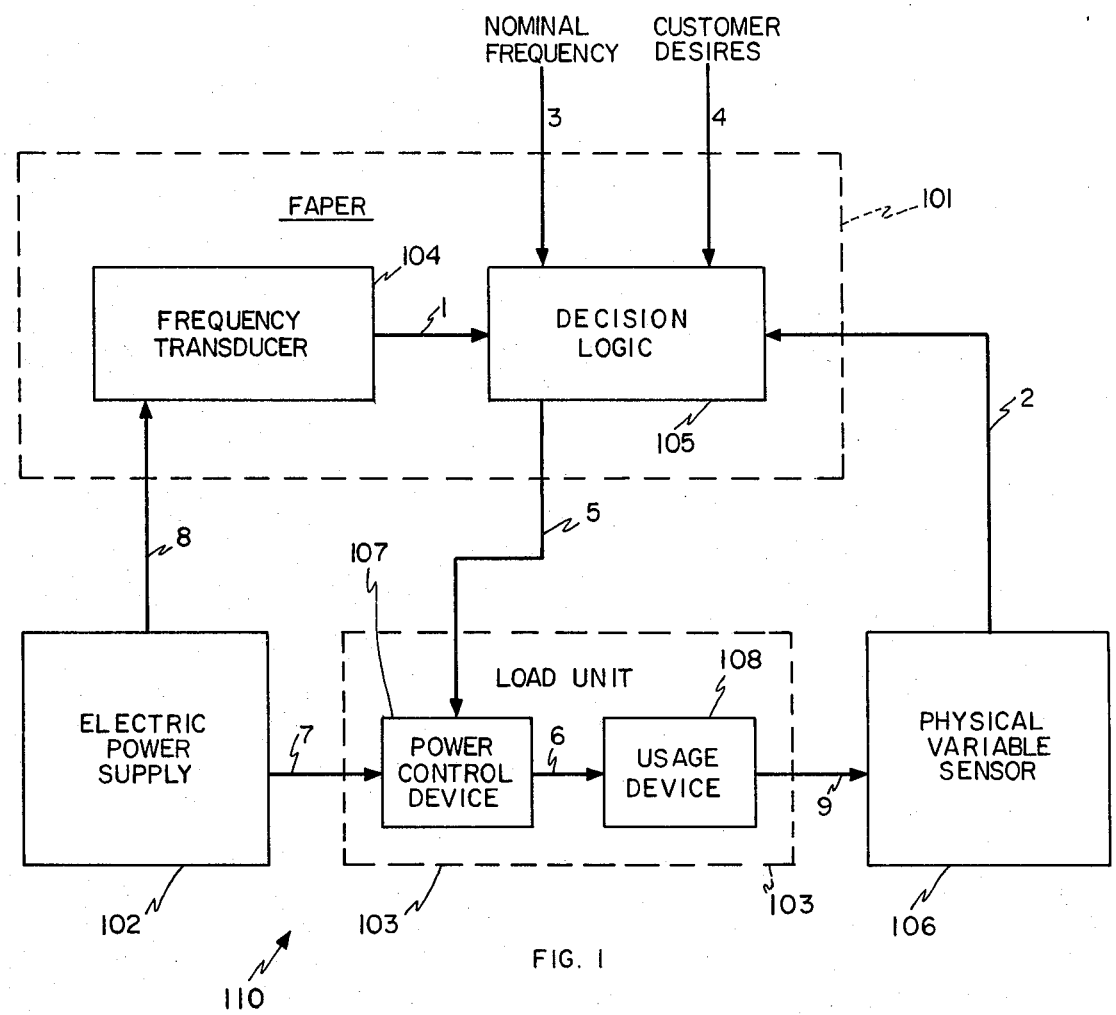
FIG. 1 shows in block diagram form an electric power system that includes supply, demand and a frequency-adaptive, power-energy re-scheduler (FAPER)

Referring now to FIG. 1, the system labeled 110 is an electric power system composed of an electric power supply 102 and a particular load unit 103 that is supplied by the supply 102. The electric power supply 102 can be taken to include all generation, transmission and distribution facilities (both utility or customer owned) and all other load units. The particular load unit 103 of concern is owned by a particular customer and can be taken to consist of the power control device 107 and a usage device 108 which is of an energy usage type. The block shown at 101 is a frequency adaptive, power-energy re-scheduler (FAPER) whose function is to control electric power used by the load unit 103 on the basis of both the requirements of both the usage device 108 and the condition of the supply 102. The re-scheduler 101 can be taken to consist of a frequency transducer 104 and a decision logic 105. The re-scheduler also contains a power supply (not shown) as needed for the frequency transducer and decision logic.

The idea here is to introduce electric energy when the load unit needs that energy and, preferably, when the supply 102 is able to accept the added load. Toward that end, the frequency transducer 104 serves to measure the frequency of the system 110 at or near the location of the load unit 103. The frequency transducer 104 output signal is sent on conductor 1 as one input to the decision logic 105. A second input to the decision logic 105 is received on conductor 2 from a physical variable sensor 106 (e.g., temperature, pressure, humidity, height, weight, volume). This input provides an indication of the usage device's needs relative to fulfilling its functions (e.g., maintaining temperature, pressure, humidity, height, weight, volume near a nominal value and/or within specified bounds). A third possible input to the decision logic 105 received on conductor 3 is the nominal frequency which may be a constant (e.g., 60 Hz) or a time varying signal provided by the electric utility. A fourth possible input to the decision logic 105 received on conductor 4 is information relating to the desires of the particular customer who owns the particular load unit 103. The output of the decision logic 105 is a signal on conductor 5 which the power control device 107 uses to determine the actual power consumption to be available for the usage device 108. Electric power flows from the power control device 107 to the usage device 108 on conductor 6. Electric power flows from the electric power supply 102 to the power control device 107 on conductor 7. Conductor 8 connects the frequency transducer 104 to some point on the electric power supply 102 which is located at or near the load unit 103 (the connection may be direct or via a transformer). Line 9 is a symbolic connection which provides an input to the physical variable sensor 106 which converts it to the physical variable signal sent on the conductor 2. The physical variable sensor may or may not be located directly on or near the load unit (e.g., a thermometer sensing house temperature need not be located close to a central space conditioning unit).

The output of the decision logic 105 on the conductor 5 determines the power the power control device 107 allows to flow on the conductor 6 to the usage device 108. The decision logic 105 can be programmed to operate in different ways depending on the nature of the usage device 108, the performance of the frequency transducer 104, the needs of the electric power supply 102, and the desires of the customer who owns the load unit. Two basic types of logic are dead band control logics and continuous control logics. In the example given below (and the demonstration system which has been implemented), the usage device 108 is an electric pump pumping water into a storage tank. In this illustrated embodiment, the physical variable to be sensed is water level $T(t)$ where t is time. The function of the re-scheduler 101 is to maintain the water level $T(t)$ of the tank within a predetermined range between a minimum allowable level $T_{min}$ and a maximum allowable level $T_{max}$. The output of the frequency transducer on the conductor 1 is called $f(t)$. The nominal frequency on the conductor 3 is called $f_o(t)$. The frequency deviation is called $\Delta f(t)$ and is defined by $$\Delta f(t) = f(t) - f_o(t)$$

The output of the decision logic 105 is called u(t) where $$0 \leq u(t) \leq 1.$$

Figure 5:
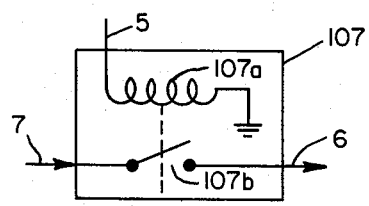
FIG. 5 is an electrical schematic diagram of a dead band type power control device.

The power control device 107 is assumed to be such that if u(t)=0, the power flow is zero and the usage device is off. If u(t)=1, the usage device is completely on. If the power control device 107 is a switch, u(t) is always zero or one. For example, referring to FIG. 5, power control device 107 can be a relay 107a having a single pole, single throw contact 107b. Thus, the signal level on line 5 in one state actuates the relay to complete the connection from conductor 7 to conductor 6, thereby connecting the usage device 108 to the electric power supply 102. In another state of the signal on line 5, the relay is released thereby interrupting the power to the usage device. However, if the power control device 107 has multiple steps or is continuously variable, u(t) can be between zero and one, as might occur with a variable rate power pump.

Figure 6:
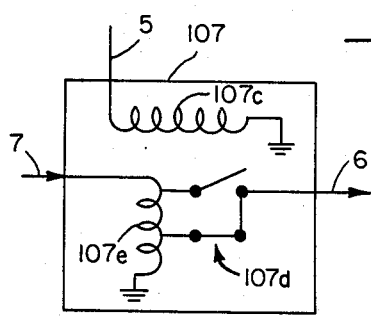
FIG. 6 is an electrical schematic diagram of a multi-step type power control device.

Here, referring to FIG. 6, power control device 107 can, for example, be a relay 107c having a double throw, single pole contact set 107d. The input source from line 7 is connected through a transformer 107e having a plurality of taps. In this configuration, in one of the states of a signal on line 5 which causes the relay coil to actuate, a first tap is chosen and the voltage associated therewith is supplied to the usage device over line 6. In a second state of the signal on line 5, the coil of relay 107c is deenergized and the voltage at a second tap of the transformer 107e is applied to the usage device through conductor 6. Dead band type control logics apply to power control devices which are switches, i.e. where u(t) is zero or one. In systems now in use, a dead band type control logic is:

$$u(t^+) = \begin{cases} u(t) & T_{min} < T(t) < T_{max} \\ 1 & T(t) \leq T_{min} \\ 0 & T(t) \geq T_{max} \end{cases} \quad (1)$$

wherein $T^+$ is time t plus a small increment. One possible dead band type control logic for use in the decision logic 105 involves changing equation (1) to:

$$u(t^+) = \begin{cases} u(t) & T_l(t) < T(t) < T_u(t) \\ 1 & T(t) \leq T_l(t) \\ 0 & T(t) \geq T_u(t) \end{cases} \quad (2)$$

where

Figure 2:
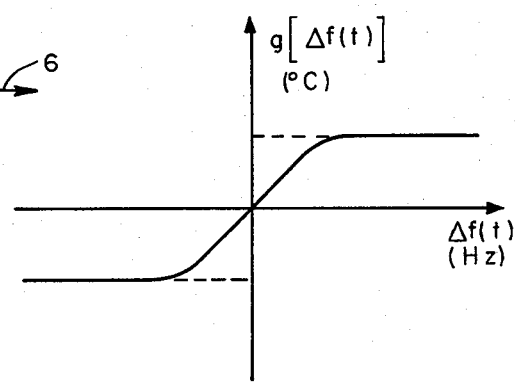
FIG. 2 is a plot which indicates one form for the power frequency response characteristics of one type of FAPER control logic.

| | $\Delta f(t) < 0$ | $\Delta f(t) > 0$ |
|---|---|---|
| $T_u(t)$ | $T_{max} + g[\Delta f(t)]$ | $T_{max}$ |
| $T_l(t)$ | $T_{min}$ | $T_{min} + g[\Delta f(t)]$ | where $g[\Delta f(t)]$ is the exogenously specified power frequency response characteristic which has roughly the shape of FIG. 2 hereof.

Continuous type control logics apply to power control devices which allow a continuously variable (or multilevel) power flow to the usage device. In systems now in use, such a control logic might be $$u(t) = \begin{cases} \alpha(T(t) - T_o) & T_{min} < T(t) < T_{max} \\ 1 & T(t) \leq T_{min} \\ 0 & T(t) \geq T_{max} \end{cases} \quad (3)$$

where $$T_o = (T_{max} + T_{min})/2$$

One possible continuous type control logic for use in the decision logic 105 involves changing Equation 3 to $$u(t) = \begin{cases} \beta_1(T(t) - T_o) + \beta_2(\Delta f(t)) + \beta_3 \int_0^t \Delta f(s)ds & \\ & T_{min} < T(t) < T_{max} \\ 1 & T(t) \leq T_{min} \\ 0 & T(t) \geq T_{max} \end{cases} \quad (4)$$

In Equation 4 the parameters $\beta_1$, $\beta_2$, $\beta_3$ are exogenously specified constants. Equations 2 and 4 are only examples of control logics that fall within the overall FAPER concept.

If one particular customer has several load units 103 under re-scheduler 101 control, a separate frequency transducer 104 and power supply for each decision logic 105 can be installed. Alternatively, a single frequency transducer and power supply could serve all the individual decision logics 105 for the individual load units 103 or a single frequency transducer, power supply, and logic could serve all the individual load units 103. For convenience of operation and maintenance, the electric utility could own and maintain the frequency transducer 104 while the customer owns and maintains the decision logic 105 part of the overall re-scheduler 101.

The nominal frequency on conductor 3 of FIG. 1 can be an electric utility provided signal which is varied to adapt to changing electric power supply 102 conditions. If the nominal frequency is constant (e.g., 60 Hz), a separate conductor 3 input is not needed. The frequency transducer 104 can be designed to provide a transducer output on the conductor 1 which measures frequency deviation from nominal, in which case the nominal frequency value would enter the frequency transducer 104 rather than the decision logic 105.

The customer who owns the load unit 103 provides inputs on the conductor 4 which determine how the decision logic 105 behaves. In the water pumping example, this input includes the minimum and maximum levels $T_{min}$ and $T_{max}$. For a dead band type control logic inputs on the conductor 4 can also include parameter values which determine the shape of the function $g(\Delta f)$ of FIG. 2. For continuous type control logics, the inputs on the conductor 4 can also include parameter values such as $\beta_1$, $\beta_2$, and $\beta_3$ of Equation 4. In some installations, some or all of these inputs may be pre-set constants. Thus, the conductor 4 is not always physically present. The physical variable sensor 106 can be designed to measure deviations of the physical variable from nominal instead of absolute quantities.

Figure 3:
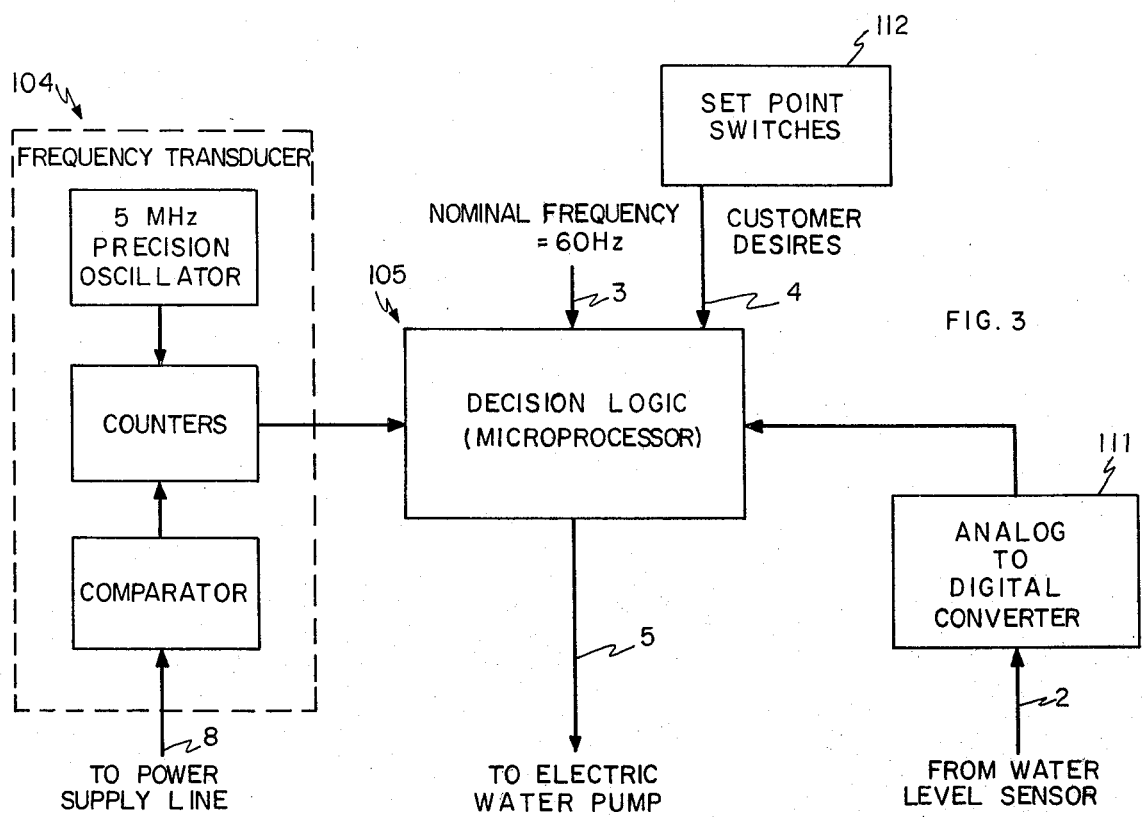
FIG. 3 is a diagrammatic representation of a form the frequency-adaptive power-energy re-scheduler of FIG. 1 can take.
Figure 4:
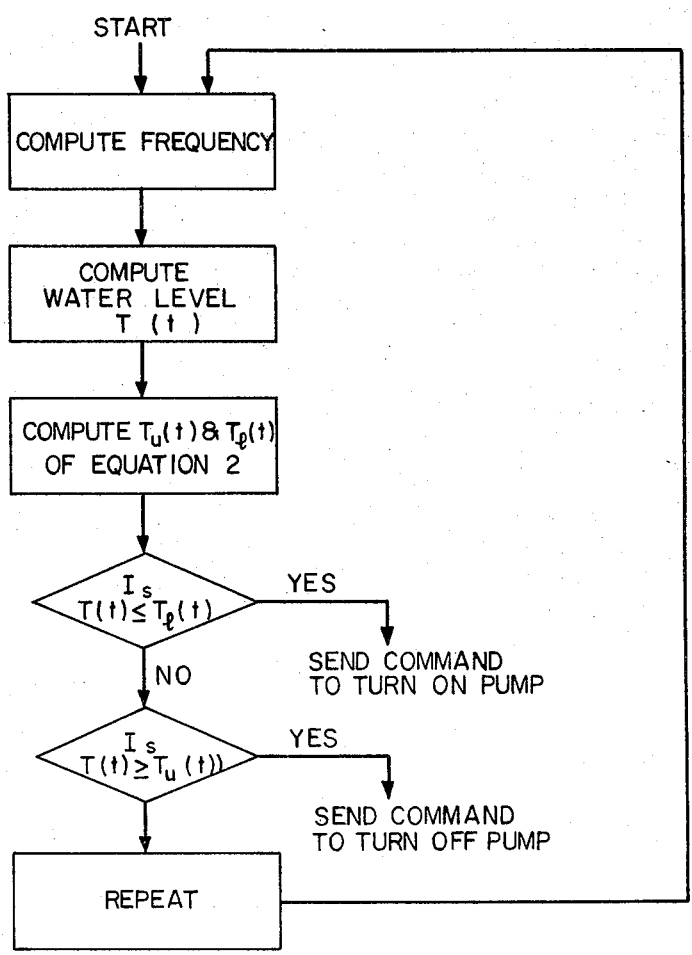
FIG. 4 is a flow chart for one form of the decision logic of the FAPER of FIG. 1.

As noted above, one version of the frequency adaptive power-energy re-scheduler was constructed. The actual usage device 108 was an electric pump on a demonstration water storage tank. The power control device 107 was a switch which turned the pump ON and OFF. FIG. 3 is a diagrammatic representation of the implemented FAPER. The major portions of the frequency transducer consists of the 5 MHz precision oscillator, two digital four bit counters and a voltage comparator. The pulse stream out of the counters provides the needed information about the frequency of the voltage on the power supply lines. The actual computation of the frequency is done every 32 cycles by the 8748 microprocessor in the logic 105 in FIG. 3. The nominal frequency is set to a constant 60 Hz. The customer's desires as to upper and lower limits on the water tank are established by the set point switches 112. A water level sensor in the tank provides an analog signal which goes through an analog to digital converter 111. The dead band type control logic as in Equation (2) was programmed into the 8748. A flow chart of the basic software logic of the 8748 is given in FIG. 4. The $g[\Delta f(t)]$ function of Eq. 2 was implemented by binary shift registering.

It will be appreciated that the function of many-many re-schedulers 101 in the system 110 of FIG. 1 is to reduce the need for spinning reserves in the system 110 with a corresponding reduction in capital and fuel costs, to reduce small (but rapid) governor actions in generators with a corresponding reduction in fuel and maintanence costs, to allow the system to accept more readily stochastically fluctuating energy sources such as wind or solar sources, to simplify expansion of cogeneration, and to improve the dynamic behavior of the system during both normal and emergency conditions. Further, as is discussed in greater detail in the Kirtley et al. paper, it gives flexibility to the user with corresponding economic consequences. And, it will be appreciated, the concepts herein disclosed provide a significant measure of stability to the system 110 by permitting control of load, in small parcels but at a multitude of locations, thereby reducing the possibility of the avalanche effect that results in a system blackout.

Further modifications of the invention herein disclosed will occur to persons skilled in the art and all such modifications are deemed to be within the spirit and scope of the invention as defined by the appended claims.

What is claimed is:

1. For use in a power distribution system wherein plural load systems operate independently of each other, a frequency adaptive power-energy re-scheduler for a said load system, that comprises, in combination:
   frequency transducer means that senses deviation of electrical input frequency from nominal frequency and provides an output signal; and
   logic means connected to receive said output signal and operable to provide an output which combines physical variable measurements to a controlled load unit to affect the values of the physical variable so as to re-schedule the electric-energy consumption of the load unit on the basis of the values of said frequency.

2. For use in an electrical power distribution system wherein plural load systems operate independently of each other, a frequency-adaptive, power-energy re-scheduler to receive an input indicating the magnitude of a physical variable and operable to provide an output that serves to control said magnitude, that comprises, in combination:
   frequency transducer means that senses deviation of the system frequency from a nominal frequency and provides an output based on said deviation; and logic means connected to receive as one input thereto the output of the frequency transducer means, which logic means is adapted to receive as a further input thereto a signal indicating the magnitude of the physical variable and is operable to process the input from the frequency transducer means and the signal indicating the magnitude of the physical variable and provide a re-scheduler output on the basis of such processing to control said magnitude.

3. A frequency-adaptive, power-energy re-scheduler as claimed in claim 2 that further includes sensor means that measures deviations in the physical variable from a nominal value thereof to provide the signal that is connected as said further input to the logic means.

4. A frequency adaptive power-energy rescheduling apparatus for adjusting the power consumption of a load unit in response to the available power from an input electric energy source, said load unit being one of a plurality of independently operating load units connected to said energy source, comprising a frequency transducer means for sensing the electrical input frequency of the input electric energy source;

a sensor means for measuring a physical variable associated with the load unit, said physical variable changing in response to operation of said load unit, a logic means responsive to said frequency transducer means and said sensor means for providing a control signal to said load unit, said logic means being further responsive to means representing a set of decision rules for providing said control signal to said load unit for effecting control of the load presented by said load unit to said electric energy source at least when said input frequency is below a desired value.

5. A frequency adaptive power-energy rescheduler apparatus according to claim 4 wherein said load unit comprises a power control device and a usage device, said power control device includes a switch means having a first and a second state, and said switch means being responsive to a first said control signal for applying said electrical energy input to said usage device and to a second said control signal for disconnecting said usage device from said electric energy input source.

6. The frequency adaptive power-energy rescheduler apparatus according to claim 4 wherein said load unit comprises a power control device and a usage device, said power control device having a plurality of control states for variably limiting the power made available to said usage device in response to said control signal.

* * * * *